United States Patent [19]
Vogel

[11] Patent Number: 6,147,627
[45] Date of Patent: *Nov. 14, 2000

[54] CODER FOR SEGMENTED CODING OF AN INPUT SIGNAL USING CONTROLLABLE QUANTIZATION BASED ON QUANTIZATION STEP SIZE AND BUFFER FULLNESS

[75] Inventor: Peter Vogel, Diepersdorf, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/977,565

[22] Filed: Nov. 25, 1997

Related U.S. Application Data

[63] Continuation of application No. 08/531,672, Sep. 21, 1995, abandoned.

[30] Foreign Application Priority Data

Sep. 22, 1994 [DE] Germany .............................. 44 33 819

[51] Int. Cl.[7] .................................................. H03M 7/00
[52] U.S. Cl. ................................................................ 341/50
[58] Field of Search .................................. 341/50, 67, 87

[56] References Cited

U.S. PATENT DOCUMENTS

| | | | |
|---|---|---|---|
| 4,578,704 | 3/1986 | Gharavi ................................... | 358/135 |
| 5,073,821 | 12/1991 | Juri ......................................... | 358/133 |
| 5,146,324 | 9/1992 | Miller et al. ............................ | 358/133 |
| 5,235,671 | 8/1993 | Mazor ..................................... | 395/2 |
| 5,245,427 | 9/1993 | Kunihiro ................................ | 358/133 |
| 5,287,178 | 2/1994 | Acampora et al. ..................... | 348/384 |
| 5,412,431 | 5/1995 | Vogel ..................................... | 348/405 |
| 5,420,705 | 5/1995 | Ray ......................................... | 358/523 |

FOREIGN PATENT DOCUMENTS

| | | |
|---|---|---|
| 0284168 | 9/1988 | European Pat. Off. . |
| 0363682 | 4/1990 | European Pat. Off. . |
| 0469648A2 | 2/1992 | European Pat. Off. . |
| 0493130A2 | 7/1992 | European Pat. Off. . |
| 4343450 | 12/1993 | Germany . |

OTHER PUBLICATIONS

"Draft Revision of Recommendation Video Codec for Audiovisual Services at PX64 KBIT/S" Image Communication 2 (1990) pp. 221–239.
International Standard DIS 10918–1 Digital Compression and Coding of Continuous Tone Still Images.
"Adaptive Spectral Perceptual Entropy Coding of High Quality Music Signals", by K. Brandenburg et al., Audio Engineering Society Preprint, 3011, 1991.

Primary Examiner—Brian Young

[57] ABSTRACT

A coder for segmented coding of an input signal (b) by using of a controllable quantizer (1C) and a buffer memory (6) is described. Data of the input signing (b), which are quantized and VLC-coded in operation, are buffered in the buffered memory (6). To avoid the conventional control, beset with drawbacks, of the quantizer (1C) by using of the filling state of the buffer memory (6), a controller (3, 4, 7, S1, S2, S3) provided with which a single adjustment of the quantizer (1C) for a signal segment to be coded is determined in that the signal segment is trial-coded at different adjustments of the quantizer (1C), the bit volume (the number of bits) is determined at each trial run, resulting in a VLC coding of the signal segment at the actually selected adjustment of the quantizer (1C), and that adjustment of the quantizer (1C) is used for the final coding and transmission of the signal segment which, during the trial runs, has yielded a bit volume which substantially corresponds to a nominal bit volume.

22 Claims, 2 Drawing Sheets

CODER FOR SEGMENTED CODING OF AN INPUT SIGNAL USING CONTROLLABLE QUANTIZATION BASED ON QUANTIZATION STEP SIZE AND BUFFER FULLNESS

CROSS REFERENCE TO RELATED APPLICATIONS

This is a continuation of application Ser. No. Ser. No. 08/531,672 filed on Sep. 21, 1995 now abandoned.

BACKGROUND OF THE INVENTION

The invention relates to a coder for segmented coding of an input signal by means of a controllable quantizer and a buffer memory in which data of the input signal, which are quantized and VLC-coded in operation, are buffered.

Such coders are used, for example in videophones constructed in accordance with the CCITT standard H.261 (cf. for example: Draft Revision of Recommendation H.261: Video Codec for Audiovisual Services at p×64 kbit/s. Signal Processing: Image Communication 2 (1990), pp. 221–239, Elsevier). This publication will hereinafter be quoted as (I).

A further possibility of use is in coding still pictures, in so far as the coding is performed in accordance with the CCITT Recommendation T.81. Coding of a still picture is performed in several steps with an increasing picture quality, while in each step the previously coded and decoded still picture is used as a prediction picture. The Recommendation T.81 will hereinafter be quoted as (II) (cf.: International Standard DIS 1011918-1. CCITT Recommendation T.81. Digital Compression and Coding of Continuous-tone Still Images. Part I: Requirements and Guidelines (JPEG)).

Finally, coders having the features described in the opening paragraph are also used in audio coding, as is clear from, for example the following document: Brandenburg, K. et al.: Aspec : Adaptive spectral entropy coding of high-quality music signals. An Audio Engineering Society preprint. Presented at the 90th Convention 1991, Feb. 19–22, Paris. Preprint 3011 (A-4). It will hereinafter be quoted as (III).

However, the present invention will mainly be explained with reference to a video coder which is compatible with the H.261 standard. Its transfer to other possibilities of use will then be evident from this special explanation.

The video data to be coded are applied image by image to a coder in accordance with (I). The signal segments mentioned hereinbefore are generally (however, see below) the prediction errors associated with a video picture in the CIF format or in the QCIF format (cf. (I)).

In accordance with (I), video data in the CIF format are hierarchically divided into further sub-data, namely into twelve groups of blocks (GOBs). Each GOB is split up into thirty-three macroblocks and each macroblock is split up into six blocks. A block consists either of 64 luminance values (Y values) of a square picture section of 8×8 pixels or of 64 values of one of the two colour difference components ($C_B$ or $C_R$ values). These chrominance values result from a picture section of 16×16 pixels which with respect to the chrominance is horizontally and vertically sub-sampled in a 1:2 ratio. A macroblock comprises both luminance and chrominance information components of a picture section of 16×16 pixels.

A coder in accordance with (I) operates in two main modes, namely the intermode or the intramode. In the intermode, the differences of the pixel data between an input picture (current picture) and its decoded and possibly motion-compensated previous picture (prediction picture) are coded. In the intramode, the input picture instead of the prediction error is coded without reference to the previous picture.

Coding is performed in blocks. The block data or the block data differences are subjected to a two-dimensional discrete cosine transform. The transform coefficients then determined are applied to a controllable quantizer, VLC coded after their quantization and stored in a buffer memory. Moreover, the coded picture is decoded again (in blocks) in a feedback branch of the coder, stored in a picture memory and used as a prediction picture for the next input picture.

The quantizer of the coder is controllable in as far as its quantization curve can be adjusted. Different quantization curves can be distinguished by the length of their quantization intervals. Within a quantization curve, the length of the quantization interval (also referred to as quantization step) is usually equal. A coarse quantization is obtained with characteristic curves having a large quantization step and a fine quantization is obtained with characteristic curves having a small quantization step. If a coarse quantization is carried out, a large quantization error is taken into the bargain and generally fewer VLC data are stored in the buffer memory. If a fine quantization is carried out, the number of bits generally increases, which bits are buffered in the form of VLC codewords in the buffer memory before they are transmitted.

The buffer memory is emptied with a temporally constant bitrate, while the memory can be filled with an extremely temporally dependent bitrate. Whether many or few bits are stored per second in the buffer memory depends on the adjustment of the quantizer as well as on the size of the prediction error, hence on the picture data.

Reference (I) does not prescribe which quantization curve is to be used for which data of a video picture. It only prescribes that only one quantization curve is to be used within a macroblock, i.e. this curve may at most be changed from macroblock to macroblock, and that always the same quantization curve should be used for the DC coefficients in the intramode. The possible quantization steps are the integral numbers 2, 4, 6 . . . up to 62.

The quantizer is generally controlled in dependence upon the filling state P of the buffer, as shown, for example in EP 0 363 682 or EP 0 284 168. Such a control is used to avoid overflow or underflow of the buffer memory. Since the capacity of memories is hardly a technical problem these days, so that the risk of overflow and the attendant loss of information no longer exists, because sufficiently large memories can be used, it is nevertheless desirable that the filling state P of the buffer memory does not exceed a threshold value PS. The reason is that the temporal distance—quite distinct at low transmission bitrates—between coding a video picture at the transmitter end and decoding and building up the same video picture at the receiver end will become unacceptably large. For example, this temporal distance should be substantially unnoticeable to the participants in a videophone dialogue. A time within a range of one tenth of a second is acceptable. Therefore, also for memory capacities which are technically almost unlimited, the problem remains that the filling state P of the buffer memory should not exceed the threshold value PS for the reasons mentioned hereinbefore.

The control of the quantizer by means of the filling state of the buffer memory only (hereinafter referred to as filling state control) generally has the result that macroblocks which belong to the same picture or to the same picture difference are quantized with different quantization curves, because the filling state of the buffer memory may be subject to large fluctuations during coding.

The change from one quantization curve to another during coding of a picture is arbitrary in the filling state control mode in the sense that this change must be effected without taking the information contents of the macroblocks still to be coded into account. Thus, parts of the picture which are important to the viewer may be coarsely quantized and other—less important—parts may be quantized in an unnecessarily fine way. Consequently, the filling state control leads to a subjectively and objectively unsatisfactory picture quality.

SUMMARY OF THE INVENTION

It is an object of the invention to perform a quantizer control in such a way that the quality of the decoded pictures is essentially improved from a subjective and an objective point of view.

In a coder of the type described in the opening paragraph, this objective is solved by
- means with which a single adjustment of the quantizer for a signal segment to be coded is determined in that
- the signal segment is trial-coded at different adjustments of the quantizer,
- the bit volume (the number of bits) is determined at each trial run, resulting in a VLC-coding of the signal segment at the actually selected adjustment of the quantizer, and
- that adjustment of the quantizer is used for the final coding and transmission of the signal segment which, during the trial runs, has yielded a bit volume which substantially corresponds to a desired bit volume.

This implies for picture coding that, for example only a single adjustment of the quantizer is used for the complete picture (signal segment)—thus for all macroblocks of a picture.

This measure is based on the recognition that the use of a single quantization curve for all blocks of a picture subjectively and objectively leads to a substantially maximum picture quality. Also the effect referred to as "blocking" is reduced. Although a distinction between important and unimportant parts of a picture is not provided, it is unambiguous that important parts are not coarsely quantized and unimportant parts are not finely quantized.

An advantageous embodiment of the invention is characterized in that means are provided for determining the final adjustment of the quantizer, using interval bisection. Such a feature accelerates the search for a suitable quantization step s only when the plausible assumption frequently confirmed by experience is based on the fact that the bit volume for each signal segment is a monotonous function of the quantization step s.

Further embodiments are characterized in that means are provided for using the finest and coarsest adjustments of the quantizer as end points of the first interval, and in that means are provided for using the finest adjustment of the quantizer as the final adjustment when the nominal bit volume is larger than the bit volume associated with the finest adjustment, and the coarsest adjustment of the quantizer is used as the final adjustment when the nominal bit volume is smaller than the bit volume associated with the coarsest adjustment, and in that means are provided for finishing the interval insertion after a predetermined number of intervals.

These and other aspects of the invention will be apparent from and elucidated with reference to the embodiment described hereinafter.

DETAILED DESCRIPTION OF THE PREFERRED EMBODIMENTS

Figure 1:
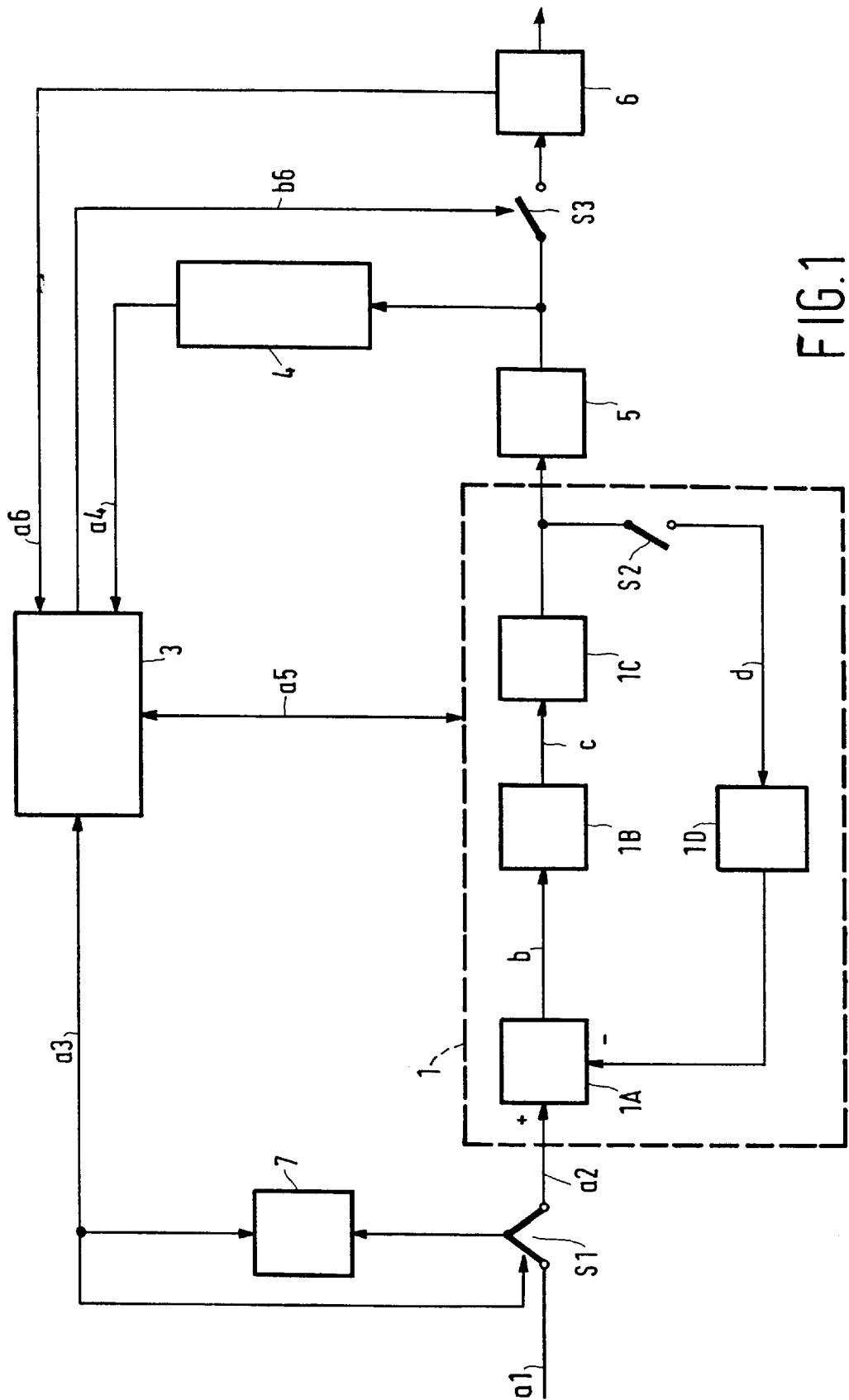
FIG. 1 is a block diagram of a coder having the inventive features.

The block diagram of FIG. 1 shows the most important functional units of a video coder operating in accordance with the prescriptions laid down in (I) and also containing additions in accordance with the present invention. Clock connections are not shown, or only indicated. A series of control connections and address connections is also omitted or only indicated so as not to complicate the Figure. However, those skilled in the art will be able to readily imagine the omitted parts in the Figure and add them to the circuit in its concrete form.

The reference numeral 1 denotes a source coder, i.e. those parts of a video coder in accordance with (I) containing as essential components a transform unit 1B, a controllable quantizer 1C and a feedback loop with a decoder 1D. Prediction pictures for input pictures are gained by the decoder 1D, which pictures are applied to the video coder 1 through a connection a2. The input pictures on the connection a2 are a selection of pictures in the CIF format received on a connection a1 at a repetition frequency of approximately 30 Hz. In the example, a switch S1 is controlled in such a way that, on average, only every third picture from the connection a1 reaches the connection a2.

A controllable functional unit 1A supplies either the input pictures from the connection a2 or the prediction errors (also in the CIF format) on a connection b. The prediction error consists of the differences between all data of an input picture and the data of the prediction picture. The signal on the connection b is the above-mentioned input signal to be coded by the source coder 1 in accordance with the prescriptions laid down in (I). It is applied after a discrete cosine transform by the unit 1B via a connection c to the controllable quantizer 1C from which it is applied via a controllable switch S2 and a section of a connection d to a variable-length coder 5, also referred to as entropy coder. The codewords of the entropy coder 5 are stored in a buffer memory 6 and read from this memory at a bitrate of 64×p kbit/s and transmitted to a receiver, possibly in a coded form. In so far as nothing else is explicitly mentioned, the case p=1 will be dealt with in the embodiment. The codewords stored in the buffer memory 6 also comprise the side information components for a picture. These components are, inter alia, the motion vector components which are required for an effective data-reducing coding of moving pictures.

All controllable functional units of the source coder 1 are controlled by a control unit 3, which is denoted by means of a connection as between the control unit 3 and the source coder 1. The invention mainly involves the control of the quantizer 1C in such a way that the filling state F of the buffer memory 6 moves within prescribed limits during operation without a change—as in the state of the art—of the adjustment of the quantizer 1C during coding of a picture. The filling state F is transmitted to the control unit 3 via a connection a6 and evaluated by this unit in a manner described hereinafter.

Moreover, there is an exchange of information between the control unit 3 and a series of special components which essentially serve for preanalysing a picture to be coded and do not need to be components of a coder in accordance with (I). These components comprise, inter alia the above-mentioned switch S1 and a picture memory 7; they are connected to the control unit 3 via a connection system a3. A further special component is a bit counter 4 which counts the bits generated per picture by the VLC coder 5 and passes on its count to the control unit 3 via a connection a4. The number of bits generated per picture by the VLC coder 5 will hereinafter be referred to as picture volume B. To perform its control functions, the control unit 3 requires the picture volume B and the buffer filling state P. A special component is also a controllable switch S3 which is controlled by the control unit 3 via a control connection b6.

The object to be solved by the control unit 3 can be summarized by way of the following question: how should the quantization step $s_i$ of the quantizer 1C for the final coding of the ith picture be chosen in order that the picture volume $B_1$ ($s_i$) at this coding assumes a predetermined nominal picture volume $BS_i$ to a satisfactory extent?.

According to the invention, the answer to this question will be described with reference to the process taking place in the circuit of FIG. 1 when a sequence of video picture is being coded. The coded pictures are enumerated; values associated with the ith coded picture are provided with an index i as has been done hereinbefore. Before coding of the first picture, the control unit 3 determines the quantity of the nominal bit volume $BS_1$ required for the first picture in order that the buffer memory 6 acquires the desired filling state by means of the data with which it is loaded during coding of the first picture. In the example, $SB_1$=64,000 bits. This number results from the quotient of the transmission bitrate (64 kbit per second) and the repetition frequency of the coded pictures (10 pictures per second); it is equally large for each picture in the example, thus it is independent of i.

The control unit 3 controls the switch S1 at the input of the coder 1. In the shown position of the switch S1, the first picture is written into the picture memory 7. When the writing process has been ended, the switch S1 is switched to its second, indicated, position and the contents of the memory 7 are applied to the source coder 1 at a raised clock frequency, and coded. The switch S1 remains in its second position until a further video picture on the connection a1 can be written into the picture memory 7.

When the first video picture is read from the picture memory 7 for the first time, the quantizer IC of the source coder 1 is adjusted to its finest quantization (s=2). Then the first trial run is performed so as to determine how many bits are used for coding the first picture at this adjustment. The control unit 3 receives the associated bit volume $B_1$(2) from the bit counter 4. The switches S2 and S3 are maintained in the position shown (blocking phase) by the control unit 3 and remain in this position as long as trial runs take place, i.e. as long as coding operations are performed solely for the purpose of determining how many bits occur per picture at a given adjustment of the quantizer. In this position it is prevented that the contents of the buffer memory 6 and the prediction picture of the decoder 1D are changed.

If the control unit has determined at the first trial run for the first picture with the quantization step s=2 that the nominal bit volume $BS_1$ is larger than the bit volume $B_1$(2), then the coding process is repeated with closed switches S2 and S3 (conducting phase). The final quantization step $s_1$ then has the value of 2.

However, if the control unit determines that the nominal picture volume $BS_1$ is smaller than the bit volume $B_1$(2), then a second search with s=62 is started with opened switches S2 and S3. If this search reveals that the nominal bit volume $BS_1$ is smaller than the bit volume $B_1$(62), then the first picture with the first quantization step s=62 is coded.

If the nominal bit volume $BS_1$ is between the picture volumes $B_1$(62) and $B_1$(2), thus if the searched quantization step is in the interval 2<s<62, a further trial run is performed, namely with the quantization step s=32; it is approximately in the middle of the interval of quantization steps with the end points s=2 and s=62. If a bit volume $B_1$(32) which is larger than the nominal bit volume $BS_1$ results for this quantization step, the searched quantization step can then be found in the interval 32<s<62, or otherwise in the interval 2<s<32. One of these sub-intervals is then used in exactly the same way as previously with the overall interval for the quantization steps (interval bi-section).

Experience has proved that after approximately 8 to 10 trial runs the bit volume corresponds to the nominal bit volume up to approximately 0.1% for practically every picture sequence. In the example, the number of trial runs is limited to ten. This means that the switches S2 and S3 are brought to their second position (conducting phase) before the tenth trial run. The tenth trial run is simultaneously the final run. The buffer memory 6 is then substantially filled with the nominal bit volume and in the decoder 1D a new prediction picture is made available for a further video picture applied via the connection a1. Before this picture is written into the memory 7, the switches S2 and S3 are brought to their non-conducting or blocking phase again.

Figure 2:
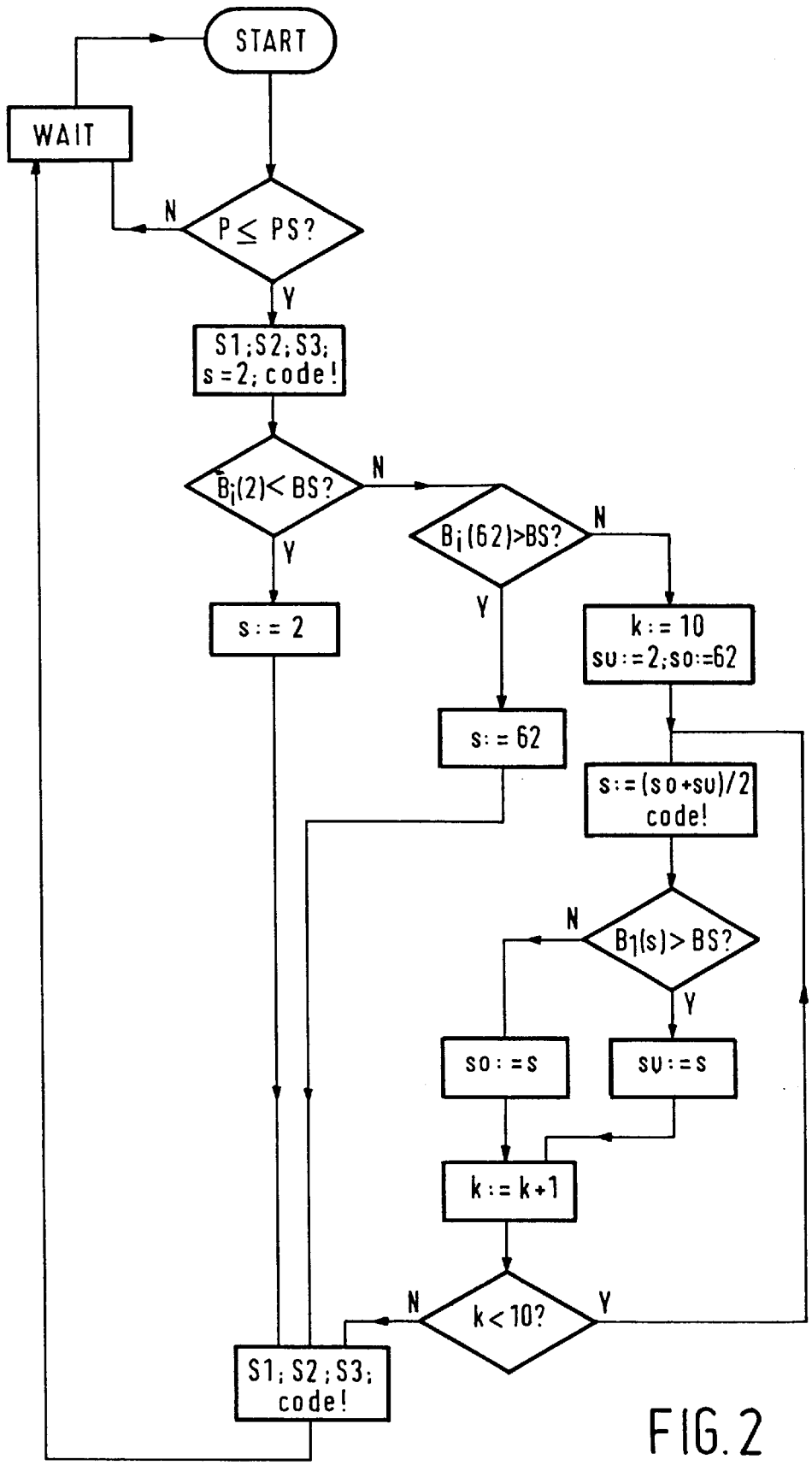
FIG. 2 is a flow chart for control of a coder having the inventive features.

The function of the control unit 3 is fixed by means of a program which comprises the program steps shown graphically in FIG. 2.

FIG. 2 will now be elucidated. After the start of the program, which is stored in the control unit 3, it first checks the filling state P of the buffer memory 6. If this filling state is larger than a threshold value PS, a waiting time is observed for the next video picture on the connection a1. The query is repeated until the filling state P is smaller than or equal to a threshold value PS. In this case the control unit 3 gives the switch S1 a position in which the coder 1 is connected to the picture memory 7. Simultaneously, the switches S2 and S3 are opened (non-conducting phase). The variable s is then set at two. The actual value of the variable s is the quantization step at which the quantizer 1C is adjusted.

Subsequently, the picture in memory 7 is trial-coded. The number of bits $B_i$(2) generated in the VLC coder is counted by the bit counter 4 and the result is passed on to the control unit 3 via the connection A4. This is succeeded by the query whether this bit volume is smaller than the nominal bit volume BS which is equal for all pictures, namely 6400 bits, in the present example.

If the last question is answered affirmatively, the switches S2 and S3 are initially brought to their conducting phase, then the picture in the memory 7 is finally coded with the quantization step 2 and after coding the switch S1 is brought to the position in which it connects the connection a1 to the input of the picture memory 7. Then a waiting time is observed for the next picture and the query $P \leq PS$? is repeated. If the answer to the query $B_1(2) \leq BS$? should be negative, the variable s is set at 62 and with this quantization step the picture in the picture memory 7 will be coded once more. If it is found that $B_1(62)>BS$, the same program sections are run through which would be run through in the case of an affirmative answer to the query $B_1(2)<s$.

If the query $B_1(62)>BS$ should be answered negatively, a run variable k is set at 10 and an auxiliary variable su is set at 2, while a further auxiliary variable so is set at 62. These two variables indicate the limits of the interval within which the searched quantization step can be found. The variable s for the quantization step is then set at the intermediate value of this interval, namely at (su+su)/2. If no admissible quantization step results from this operation, the value should be rounded off accordingly. With this quantization step, a further trial run is then started, whereafter it is queried whether the resultant bit volume $B_t(s)$ is larger than the nominal bit volume BS. If affirmative, the value of the variable su is set at the current value of s, and if negative, the variable so is set at the current value of s. The run variable k is then raised by one unit and subsequently it is queried whether its value is still smaller than 10 or not. If negative, a final coding operation is performed, and if affirmative, the loop for the run variable k is run through once more.

The means indicated in the embodiment for a single adjustment of the quantizer for a picture to be coded may also be replaced by other means serving the same purpose.

For example, the picture memory 7 may be omitted. Instead, however, a memory in which the transformed values of an input picture are buffered should be inserted between the transform unit 1B and the quantizer 1C. Then the repeated transform operation can be dispensed with during the trial run.

It is alternatively feasible to omit the bit counter 4 because, for the function described, the control unit 3 only needs the number of bits occurring upon VLC-coding instead of the bits themselves . Under circumstances, this number can be gained from the VLC coder 5 when the length of the codewords by which a video picture is coded can be queried in a simple manner. Then, only these lengths should be cumulated.

The operation of the switches S1, S2 and S3 may alternatively be realised by other means, for example by interrupting the clock pulse supply at appropriate instants.

What is claimed is:

1. A coder for performing segmented coding on an input signal, comprising:
   a controllable quantizer for quantizing the input signal;
   a buffer for buffering the quantized input signal the buffer having at least a nominal bit volume;
   a controller for controlling the quantizer and for providing a first quantization step size to the quantizer for use in quantizing a segment of the input signal; and
   a bit volume measurer for measuring a bit volume of the segment after the segment has been quantized at the first quantization step size;
   wherein the controller compares the bit volume of the quantized segment at the first quantization step size to the nominal bit volume and, if the bit volume is less than or equal to the nominal bit volume, causes the quantized segment to pass to the buffer, otherwise the controller provides one or more subsequent quantization step sizes to the quantizer until a bit volume of a resulting quantized segment is less than or equal to the nominal bit volume, whereafter the controller causes the resulting quantized segment to pass to the buffer.

2. A coder as claimed in claim 1, wherein the controller determines a final quantization step size for the resulting segment using interval bi-section.

3. A coder as claimed in claim 2, wherein the controller determines the final quantization step size using quantization step sizes which produce fine and coarse quantizations.

4. A coder as claimed in claim 3, wherein the controller provides the quantization step size that produces fine quantization as the final quantization step size when the nominal bit volume is larger than a bit volume produced using the quantization step size that produces fine quantization; and
   wherein the controller provides the quantization steps size that produces coarse quantization as the final quantization step size when the nominal bit volume is smaller than a bit volume produced using the quantization step size that produces coarse quantization.

5. A coder as claimed in claim 2, wherein the controller performs interval bi-section for a predetermined number of intervals starting with quantization step sizes which produce maximum fine and maximum coarse quantizations.

6. A coder as claimed in claim 1, wherein said coder is a video coder; and
   wherein the signal segments are at least a video picture, or a part of a video picture, or differences of video pictures, or parts of difference pictures.

7. A method of coding an input video signal in accordance with a predetermined bit volume, where the predetermined bit volume corresponds to an output buffer threshold, the method comprising the steps of:
   coding the input video signal at a first quantization step size to produce a first bitstream having a first bit volume and, if the first bit volume is less than the predetermined bit volume, outputting the first bitstream to the output buffer;
   if the first bit volume is greater than the predetermined bit volume, coding the input video signal at a second quantization step size to produce a second bitstream having a second bit volume and, if the second bit volume is greater than the predetermined bit volume, outputting the second bitstream to the output buffer; and
   if the predetermined bit volume falls between the first bit volume and the second bit volume, determining a third quantization step size which is between the first and second quantization step sizes, coding the input video signal at the third quantization step size to produce a third bitstream, and outputting the third bitstream to the output buffer.

8. A method according to claim 7, wherein the third quantization step size comprises a $K^{th}$ (K>1) quantization step size, where the $K^{th}$ quantization step size is determined by:
   coding the input video signal at an $N^{th}$ ($1 \leq N \leq K$) quantization step size which is substantially mid-way between two quantization step sizes, where the first two quantization step sizes comprise the first and second quantization step sizes;
   comparing a resulting bit volume of a coded bitstream produced by coding at the $N^{th}$ quantization step size to the predetermined bit volume;
   in a case that the predetermined bit volume is less than the resulting bit volume, determining a next quantization step size by (i) substituting the $N^{th}$ quantization step size for a greater of the two quantization step sizes, and (ii) determining the mid-way between the $N^{th}$ quantization step size and a lesser of the two quantization step sizes;
   in a case that the predetermined bit volume is greater than the resulting bit volume, determining a next quantization step size by (i) substituting the $N^{th}$ quantization step size for the lesser of the two quantization step sizes, and (ii) determining the mid-way between the $N^{th}$ quantization step size and the greater of the two quantization step sizes; and repeating the coding, comparing and determining steps K times.

9. A method according to claim 8, wherein the first quantization step size corresponds to relatively fine quantization, and the second quantization step size corresponds to relatively coarse quantization.

10. A method according to claim 7, wherein the method further comprises, before the coding step, the steps of:
storing the input video signal in a memory; and
outputting the video signal from the memory to be coded based, at least in part, on a state of the output buffer.

11. An apparatus for coding an input video signal in accordance with a predetermined bit volume, where the predetermined bit volume corresponds to an output buffer threshold, the apparatus comprising:
a coder that is able to code the input video signal using at least first, second and third quantization step sizes so as to produce, respectively, first, second and third bitstreams having first, second and third bit volumes; and
a controller which controls both the quantization step size of the coder and output of the bitstreams from the coder to the output buffer;
wherein the controller:
(i) determines if the first bit volume is less than the predetermined bit volume and, in that case, causes the coder to code the input video signal at the first quantization step size and to output the first bitstream to the output buffer;
(ii) determines if the second bit volume is greater than the predetermined bit volume and, in that case, causes the coder to code the input video signal at the second quantization step size and to output the second bitstream to the output buffer; and
(iii) determines if the predetermined bit volume falls between the first bit volume and the second bit volume and, in that case, determines a third quantization step size which is between the first and second quantization step sizes, and causes the coder to code the input video signal at the third quantization step size to produce a third bitstream and to output the third bitstream to the output buffer.

12. An apparatus according to claim 11, wherein the third quantization step size comprises a $K^{th}$ (K>1) quantization step size, where the $K^{th}$ quantization step size is determined by:
the coder coding the video signal at an $N^{th}$ ($1 \leq N \leq K$) quantization step size which is substantially mid-way between two quantization step sizes, where the first two quantization step sizes comprise the first and second quantization step sizes; and
the controller (i) comparing a resulting bit volume of a coded bitstream produced by coding at the Nth quantization step size to the predetermined bit volume, (ii) in a case that the predetermined bit volume is less than the resulting bit volume, determining a next quantization step size by substituting the $N^{th}$ quantization step size for a greater of the two quantization step sizes and determining the mid-way between the $N^{th}$ quantization step size and a lesser of the two quantization step sizes, and, (iii) in a case that the predetermined bit volume is greater than the resulting bit volume, determining a next quantization step size by substituting the $N^{th}$ quantization step size for the lesser of the two quantization step sizes and determining the mid-way between the $N^{th}$ quantization step size and the greater of the two quantization step sizes; and (iv) causing the coding, comparing and substituting to repeat K times.

13. An apparatus according to claim 12, wherein the first quantization step size corresponds to relatively fine quantization, and the second quantization step size corresponds to relatively coarse quantization.

14. An apparatus according to claim 11, further comprising:
a memory which stores the input video signal; and
a switch interposed between the memory and the coder;
wherein the controller sets the switch so as to provide the input video signal to the coder based, at least in part, on a state of the output buffer.

15. A method of coding an input video signal to produce a bitstream having substantially a predetermined bit volume, where the predetermined bit volume corresponds to an output buffer threshold, the method comprising the steps of:
performing one or more trial coding processes on the input video signal using one or more respective quantization step sizes;
determining which quantization step size produces a coded bitstream having a bit volume that substantially corresponds to the predetermined bit volume based on the one or more trial coding processes; and
coding the input video signal using the quantization step size determined in the determining step.

16. A method according to claim 15, wherein the coding step produces an output bitstream having a bit volume that substantially corresponds to the predetermined bit volume, and wherein the method further comprises the step of providing the output bitstream to the output buffer.

17. A method according to claim 15, wherein the determining step comprises (i) counting a number of bits in a coded bitstream produced by the performing step, and (ii) comparing the number of bits to the predetermined bit volume.

18. A method according to claim 15, further comprising, before the performing step, the steps of:
storing the input video signal in a memory; and
outputting the video signal from the memory to the one or more trial coding processes based, at least in part, on a state of the output buffer.

19. An apparatus for coding an input video signal to produce a bitstream having substantially a predetermined bit volume, where the predetermined bit volume corresponds to an output buffer threshold, the apparatus comprising:
coding circuitry that performs one or more trial coding processes on the input video signal using one or more respective quantization step sizes; and
a controller that determines which quantization step size produces a coded bitstream having a bit volume that substantially corresponds to the predetermined bit volume based on the one or more trial coding processes;
wherein, following the one or more trial coding processes, the coding circuitry codes the input video signal using the quantization step size determined by the controller and outputs the resulting coded bitstream to the output buffer.

20. An apparatus according to claim 19, further comprising a bit counter which determines bit volumes of coded bitstreams output from the coding circuitry, and which provides the bit volumes to the controller.

21. An apparatus according to claim 19, further comprising a switch interposed between the coding circuitry and the output buffer;
wherein the controller opens the switch during the trial coding processes so as to prevent coded bitstreams from entering the output buffer; and wherein the controller closes the switch prior to the coding circuitry coding the input video signal using the determined quantization step size so as to permit the resulting coded bitstream to enter the output buffer.

22. An apparatus according to claim 19, further comprising:

a memory which stores the input video signal; and a switch interposed between the memory and the coding circuitry;

wherein the controller sets the switch so as to provide the input video signal to the coding circuitry based, at least in part, on a state of the output buffer.

* * * * *